United States Patent
Li et al.

(10) Patent No.: US 12,473,008 B2
(45) Date of Patent: Nov. 18, 2025

(54) STEERING COLUMN AND VEHICLE

(71) Applicants: ZHEJIANG ZEEKR INTELLIGENT TECHNOLOGY CO., LTD., Zhejiang (CN); ZHEJIANG GEELY HOLDING GROUP CO., LTD., Zhejiang (CN)

(72) Inventors: Lin Li, Zhejiang (CN); Fuhai Li, Zhejiang (CN); Zuguo Ma, Zhejiang (CN); Jianfeng Bian, Zhejiang (CN); Fei Xu, Zhejiang (CN)

(73) Assignees: ZHEJIANG ZEEKR INTELLIGENT TECHNOLOGY CO., LTD., Zhejiang (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 0 days.

(21) Appl. No.: 19/066,201

(22) Filed: Feb. 28, 2025

(65) Prior Publication Data
US 2025/0196908 A1 Jun. 19, 2025

Related U.S. Application Data

(63) Continuation of application No. PCT/CN2023/109970, filed on Jul. 28, 2023.

(30) Foreign Application Priority Data

Sep. 6, 2022 (CN) .......................... 202211083443.2

(51) Int. Cl.
*B62D 1/181* (2006.01)
*B62D 1/183* (2006.01)

(52) U.S. Cl.
CPC ............. *B62D 1/181* (2013.01); *B62D 1/183* (2013.01)

(58) Field of Classification Search
CPC ................................ B62D 1/181; B62D 1/183
See application file for complete search history.

(56) References Cited

U.S. PATENT DOCUMENTS

| 2014/0305252 A1 | 10/2014 | Mizuno |
| 2017/0015345 A1* | 1/2017 | Galehr ................... B62D 1/181 |
| 2018/0251149 A1 | 9/2018 | Osawa et al. |

FOREIGN PATENT DOCUMENTS

| CN | 1659074 A | 8/2005 |
| CN | 106564526 A | 4/2017 |

(Continued)

OTHER PUBLICATIONS

International Search Report dated Nov. 19, 2023 in International Application No. PCT/CN2023/109970. English translation attached.

(Continued)

*Primary Examiner* — Faye M Fleming

(57) ABSTRACT

Provided are a steering column and a vehicle. The steering column includes: a fixation base; a movable base movably disposed at the fixation base in a first direction; a first drive mechanism disposed at the fixation base and connected to the movable base, the first drive mechanism being configured to drive the movable base to move relative to the fixation base; a lower column assembly disposed at the movable base, the lower column assembly having an axial direction same as the first direction; an upper column assembly movably disposed at the lower column assembly in the first direction; and a second drive mechanism disposed at the lower column assembly and connected to the upper column assembly, the second drive mechanism being configured to drive the upper column assembly to move relative to the lower column assembly.

18 Claims, 3 Drawing Sheets

(56) References Cited

FOREIGN PATENT DOCUMENTS

| | | | | |
|---|---|---|---|---|
| CN | 107298126 | A | 10/2017 | |
| CN | 108045428 | A | 5/2018 | |
| CN | 207312400 | U | 5/2018 | |
| CN | 109291985 | A | 2/2019 | |
| CN | 209336807 | U | 9/2019 | |
| CN | 112109796 | A * | 12/2020 | ............. B62D 1/185 |
| CN | 112678065 | A | 4/2021 | |
| CN | 113212535 | A | 8/2021 | |
| CN | 214930034 | U | 11/2021 | |
| CN | 114291155 | A | 4/2022 | |
| CN | 216580678 | U | 5/2022 | |
| CN | 115416744 | A | 12/2022 | |
| JP | 2012131330 | A | 7/2012 | |
| WO | 2019228355 | A1 | 12/2019 | |
| WO | 2021256169 | A1 | 12/2021 | |

OTHER PUBLICATIONS

First Office Action from corresponding Chinese Application No. 202211083443.2, dated Apr. 17, 2023. English translation attached.
The Grant Notice from corresponding Chinese Application No. 202211083443.2, dated May 31, 2023. English translation attached.

* cited by examiner

STEERING COLUMN AND VEHICLE

CROSS-REFERENCE TO RELATED APPLICATION

This application is a continuation of International Application No. PCT/CN2023/109970, filed on Jul. 28, 2023, which is based on and claims priority to Chinese patent application No. 202211083443.2 filed on Sep. 6, 2022, the entire contents of which are incorporated herein by reference.

FIELD

The present disclosure relates to the field of steering column technologies, and more particularly, to a steering column and a vehicle.

BACKGROUND

To meet retractable function of a steering wheel of a smart cabin, provide the driver with more ample space to get in and out of the vehicle, and enhance the science fiction experience, the steering wheel can be retracted through a long-stroke axial adjustment mechanism of a steering column, to provide a safety space between the steering column and a front wall. Furthermore, a driver is protected in the event of a vehicle collision, thereby improving safety performance.

In the existing column axial adjustment mechanism, if a longer stroke axial adjustment is achieved, an overall length of the steering column will increase, and the vehicle layout space cannot be met. If the overall length of the steering column is increased, the safety space between the steering column and the front wall can be occupied, which may be detrimental to driver's safety in the event of the vehicle collision.

SUMMARY

The steering column provided according to an embodiment of the present disclosure includes: a fixation base; a movable base movably disposed at the fixation base in a first direction; a first drive mechanism disposed at the fixation base and connected to the movable base, the first drive mechanism being configured to drive the movable base to move relative to the fixation base; a lower column assembly disposed at the movable base, the lower column assembly having an axial direction same as the first direction; an upper column assembly movably disposed at the lower column assembly in the first direction; and a second drive mechanism disposed at the lower column assembly and connected to the upper column assembly, the second drive mechanism being configured to drive the upper column assembly to move relative to the lower column assembly.

In some embodiments, the lower column assembly has a chamber in an interior of the lower column assembly. The upper column assembly is nested in the chamber. The lower column assembly has a first guide groove extending in the first direction and in communication with the chamber. The second drive mechanism includes a connector movable in the first direction and slidably disposed in the first guide groove, the connector being connected to the upper column assembly by passing through the first guide groove.

In some embodiments, the second drive mechanism further includes a second lead screw motor assembly disposed at the movable base, the second lead screw motor assembly being provided with a second lead screw nut at a lead screw of the second lead screw motor assembly, and the second lead screw nut being connected to the connector.

In some embodiments, the first drive mechanism includes a first lead screw motor assembly, the first lead screw motor assembly being provided with a first lead screw nut at a lead screw of the first lead screw motor assembly, and the first lead screw nut being connected to the movable base.

In some embodiments, the lower column assembly is pivotably disposed at the movable base. The steering column further includes an angle adjustment mechanism disposed at the movable base, the angle adjustment mechanism being connected to the lower column assembly to enable the lower column assembly to swing in the first direction.

In some embodiments, the lower column assembly has a second guide groove extending in the first direction. The angle adjustment mechanism includes: a swing base having a first pivot disposed at the movable base, a second pivot slidably disposed in the second guide groove, and a swing arm; and a drive member disposed at the movable base, the drive member being connected to the swing arm and configured to drive the swing arm to move in the first direction.

In some embodiments, the drive member is a third lead screw motor assembly, the third lead screw motor assembly being provided with a third lead screw nut at a lead screw of the third lead screw motor assembly, and the third lead screw nut being connected to the swing arm.

In some embodiments, the angle adjustment mechanism and the second drive mechanism are disposed at two sides of the lower column assembly in an axial direction of the lower column assembly. The first drive mechanism is disposed at a side of the angle adjustment mechanism away from the lower column assembly.

In some embodiments, the fixation base has a recess on a surface of the fixation base, the recess passing through the fixation base in the first direction, the recess having slide grooves at two sides of the recess in the first direction. The movable base is disposed in the recess. The movable base is provided with ridges at two sides of the movable base in the first direction, the ridges being disposed in the slide grooves.

The vehicle provided according to the embodiment of the present disclosure includes the steering column described above.

Additional aspects and advantages of the present disclosure will be provided at least in part in the following description, or will become apparent at least in part from the following description, or can be learned from practicing of the present disclosure.

BRIEF DESCRIPTION OF THE DRAWINGS

The above and/or additional aspects and advantages of the present disclosure will become more apparent and more understandable from the following description of embodiments taken in conjunction with the accompanying drawings.

REFERENCE NUMERALS OF THE ACCOMPANYING DRAWINGS

Figure 1:
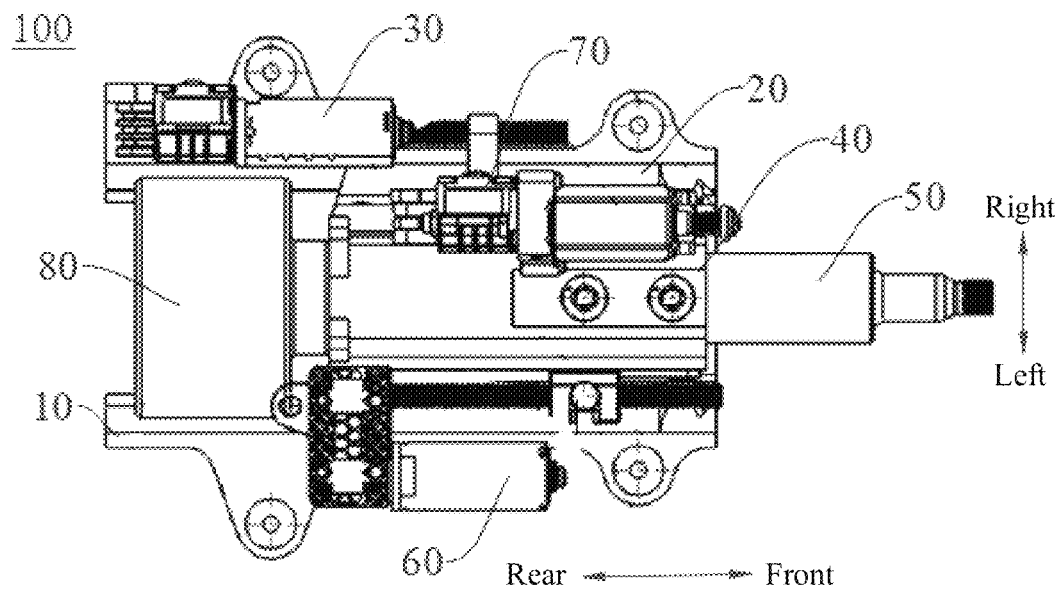
FIG. 1 is a top view of a steering column according to an embodiment of the present disclosure.

100 steering column;
10 fixation base; 101 recess; 102 slide groove;
20 movable base; 201 ridge;
30 first drive mechanism; 301 first lead screw nut;
40 lower column assembly; 401 first guide groove; 402 second guide groove; 403 pivot shaft;
50 upper column assembly;
60 second drive mechanism; 610 connector; 620 second lead screw motor assembly;
70 angle adjustment mechanism; 710 swing base; 7101 first pivot; 7102 second pivot; 7103 swing arm; 7103a mounting groove; 720 drive member;
80 controller and lower shaft.

DETAILED DESCRIPTION OF THE EMBODIMENTS

Embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the embodiments of the present disclosure.

In the description of the present disclosure, it should be understood that, the orientation or the position indicated by terms such as "length," "width," "thickness," "over," "below," "front," "rear," "left," "right," "vertical," "horizontal," "top," "bottom," "inner," "outer," "axial," "radial," and "circumferential" should be construed to refer to the orientation and the position as shown in the drawings, and is only for the convenience of describing the present disclosure and simplifying the description, rather than indicating or implying that the pointed device or element must have a specific orientation, or be constructed and operated in a specific orientation, and therefore cannot be understood as a limitation of the present disclosure.

In addition, the features associated with "first" and "second" may explicitly or implicitly include one or more of the features, and are used to distinguish the features without implying any order or priority.

In the description of the present disclosure, unless otherwise specified, "plurality" means two or more.

In the description of the present disclosure, it should be noted that, unless otherwise clearly stipulated and limited, terms such as "mount," "connect," and "connect to" should be understood in a broad sense. For example, it may be a fixed connection or a detachable connection or connection as one piece; mechanical connection or electrical connection; direct connection or indirect connection through an intermediate; or internal communication of two components. For those skilled in the art, specific meanings of the above-mentioned terms in the present disclosure can be understood according to specific circumstances.

The present disclosure aims to solve at least one of the technical problems in the related art. To this end, an embodiment of the present disclosure is to provide a steering column capable of increasing an axial adjustment stroke and satisfying steering wheel retraction in the case where a large safety space between the steering column and the front wall is ensured.

The present disclosure further aims to provide a vehicle, applied to the steering column described above.

A steering column 100 according to embodiments of the present disclosure is described below with reference to the accompanying drawings.

Figure 2:
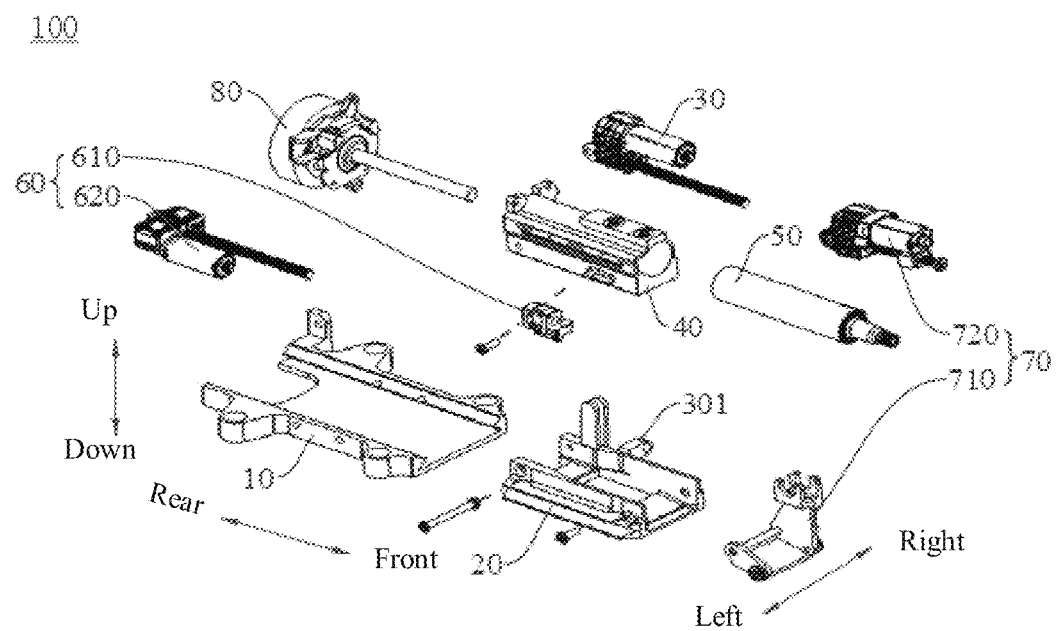
FIG. 2 is an exploded view of a steering column according to an embodiment of the present disclosure.

As illustrated in FIG. 1 and FIG. 2, the steering column 100 according to the embodiments of the present disclosure includes a fixation base 10, a movable base 20, a first drive mechanism 30, a lower column assembly 40, an upper column assembly 50, and a second drive mechanism 60.

The movable base 20 is movably disposed at the fixation base 10 in a first direction. The first drive mechanism 30 is disposed at the fixation base 10 and connected to the movable base 20. The first drive mechanism 30 is configured to drive the movable base 20 to move relative to the fixation base 10. The lower column assembly 40 is disposed at the movable base 20. The lower column assembly 40 has an axial direction same as the first direction. The upper column assembly 50 is movably disposed at the lower column assembly 40 in the first direction. The second drive mechanism 60 is disposed at the lower column assembly 40 and connected to the upper column assembly 50. The second drive mechanism 60 is configured to drive the upper column assembly 50 to move relative to the lower column assembly 40.

In an exemplary embodiment of the present disclosure, the fixation base 10 of the steering column 100 is configured to be connected with a pipe beam of a vehicle by a bolt or a nut. The upper column assembly 50 is configured to be connected with a steering wheel. The "first direction" is same as the axial direction of the lower column assembly 40. The "first direction" may be a front-rear direction in FIG. 1. The first drive mechanism 30 may drive the movable base 20 and the lower column assembly 40 to perform a reciprocating movement in the first direction together to realize first-level axial adjustment. The second drive mechanism 60 may drive the upper column assembly 50 to perform a reciprocating movement in the first direction on the lower column assembly 40 to realize second-level axial adjustment. It can be seen that the first-level axial adjustment and the second-level axial adjustment can superimpose an adjustment stroke, expanding an axial adjustment stroke.

It should be noted that the steering column 100 further includes other components, such as a controller and a lower shaft 80, which are disposed at the lower column assembly 40. The controller and the lower shaft 80 can be connected to the lower column assembly 40 by the bolt. Structures and operations of other components of the steering column 100, such as the controller and the lower shaft 80, are known to those of ordinary skill in the art and thus details thereof will be omitted here.

With the steering column 100 according to the embodiments of the present disclosure, the movable base 20 is disposed at the fixation base 10, the lower column assembly 40 is disposed at the movable base 20, the upper column assembly 50 is movably disposed at the lower column assembly 40, the first drive mechanism 30 is configured to drive the movable base 20 to move relative to the fixation base 10, and the second drive mechanism 60 is configured to drive the upper column assembly 50 to move relative to the lower column assembly 40. In this way, in the case where the length of the column remains unchanged, a longer adjustment stroke of the column is achieved, and a larger safety space between the column and the front wall can be ensured, thereby improving safety of a driver in the event of the vehicle collision and satisfying requirements for steering wheel retraction.

Figure 4:
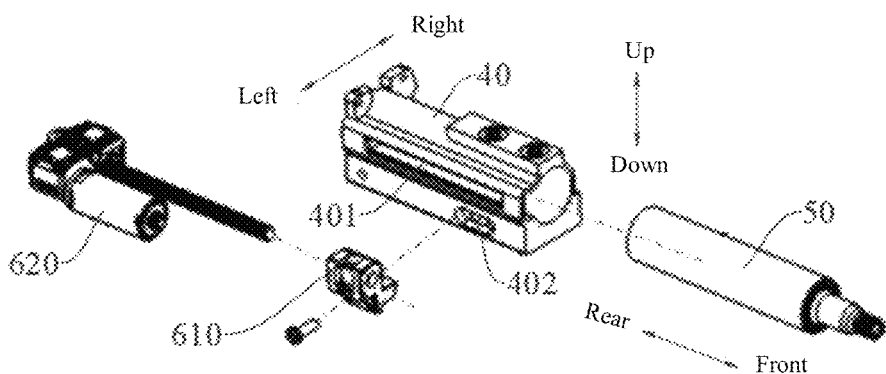
FIG. 4 is a first exploded partial view of a structure of a steering column according to an embodiment of the present disclosure.
Figure 5:
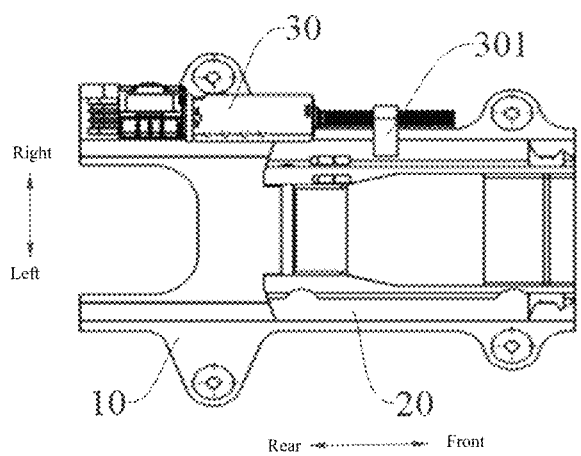
FIG. 5 is a partial top view of a structure of a steering column according to an embodiment of the present disclosure.

In some embodiments, as illustrated in FIG. 2 and FIG. 4, the lower column assembly 40 has a chamber (not illustrated) in an interior of the lower column assembly 40. The upper column assembly 50 is nested in the chamber. The lower column assembly 40 has a first guide groove 401 extending in the first direction and in communication with the chamber. The second drive mechanism 60 includes a connector 610 movable in the first direction and slidably disposed in the first guide groove 401. The connector 60 is connected to the upper column assembly 50 by passing through the first guide groove 401. The upper column assembly 50 and the chamber are mounted in a bushing manner, which can ensure that movement of the upper column assembly 50 on the lower column assembly 40 is more stable and reliable. Also, an overall structure is also relatively compact, saving a space. Further, the connector 610 is connected to the upper column assembly 50 in an cavity through the first guide groove 401, enabling the second drive mechanism 60 to drive the upper column assembly 50 to move relative to the lower column assembly 40. The first guide groove 401 can not only provide a movement space for the connector 610, but also provide guidance for the connector 610, improving movement reliability and stability of the connector 610.

Figure 3:
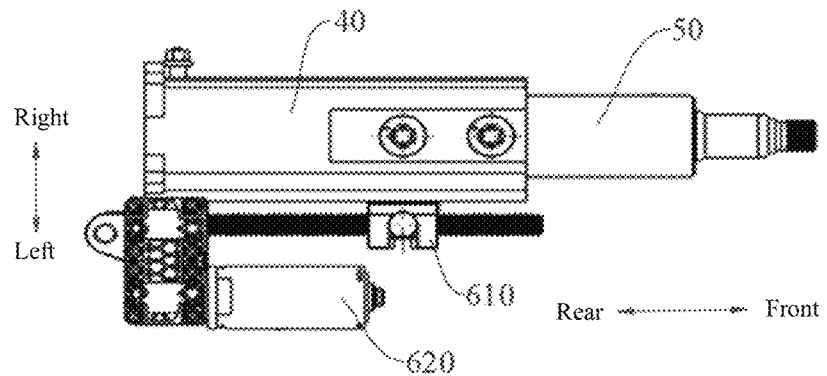
FIG. 3 is a schematic partial view of a structure of a steering column according to an embodiment of the present disclosure.

In some embodiments, as illustrated in FIG. 2, FIG. 3, and FIG. 4, the second drive mechanism 60 further includes a second lead screw motor assembly 620 disposed at the movable base 20. The second lead screw motor assembly 620 is provided with a second lead screw nut (not illustrated) at a lead screw of the second lead screw motor assembly 620. The second lead screw nut is connected to the connector 610. With a drive structure like the second lead screw motor assembly, which is relatively simple and easy to control, the second lead screw nut and the connector 610 can be driven to move together by driving a lead screw to rotate by a motor.

In other examples, the second drive mechanism 60 may be any one of a linear movement module, a cylinder, and an electric push rod. Of course, the second drive mechanism 60 may be another mechanism capable of realizing linear movement, and thus details thereof will be omitted here.

In an exemplary embodiment of the present disclosure, the second lead screw motor assembly may be connected to the movable base 20 by the bolt.

Figure 6:
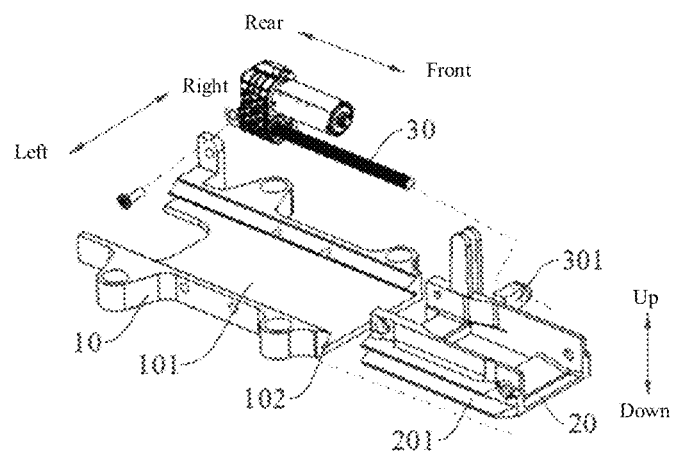
FIG. 6 is a second exploded partial view of a structure of a steering column according to an embodiment of the present disclosure.

In some embodiments, as illustrated in FIG. 2 and FIG. 6, the first drive mechanism 30 includes a first lead screw motor assembly. The first lead screw motor assembly is provided with a first lead screw nut 301 at a lead screw of the first lead screw motor assembly. The first lead screw nut 301 is connected to the movable base 20. With a drive structure like the first lead screw motor assembly, which is relatively simple and easy to control, the first lead screw nut 301 and the movable base 20 can be driven to move together by driving the lead screw to rotate by the motor.

In an exemplary embodiment of the present disclosure, as illustrated in FIG. 2 and FIG. 6, the first lead screw nut 301 can be integrated on the movable base 20, reducing mounting steps and improving a mounting efficiency.

In some embodiments, the first lead screw nut 301 may further be detachably connected to the movable base 20 to facilitate maintenance or replacement.

In other examples, the first drive mechanism 30 may be any one of the linear movement module, the cylinder, and the electric push rod. Of course, the first drive mechanism 30 may be another mechanism capable of realizing the linear movement, and thus details thereof will be omitted here.

In an exemplary embodiment of the present disclosure, the first lead screw motor assembly may be connected to the fixation base 10 by the bolt.

In some embodiments, as illustrated in FIG. 2, the lower column assembly 40 is pivotably disposed at the movable base 20. The steering column 100 further includes an angle adjustment mechanism 70 disposed at the movable base 20. The angle adjustment mechanism 70 is connected to the lower column assembly 40 to enable the lower column assembly 40 to swing in the first direction. The angle adjustment mechanism 70 may drive the lower column assembly 40 to swing in the first direction on the movable base 20 to achieve angle adjustment.

Figure 7:
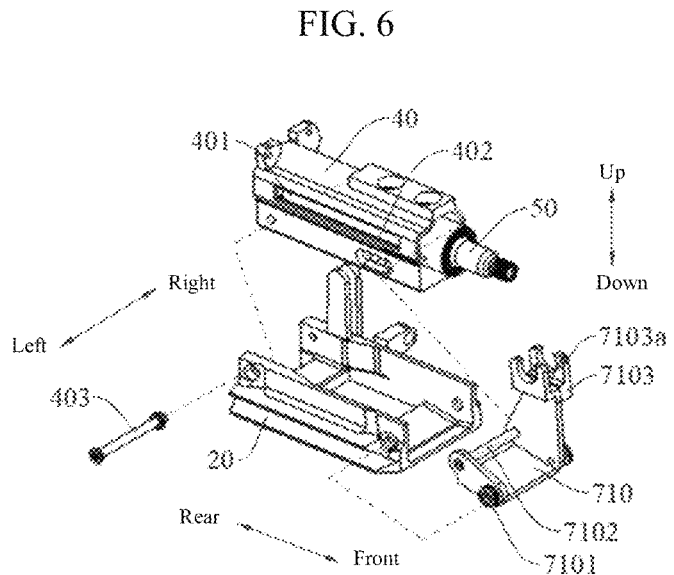
FIG. 7 is a third exploded partial view of a structure of a steering column according to an embodiment of the present disclosure.
Figure 8:
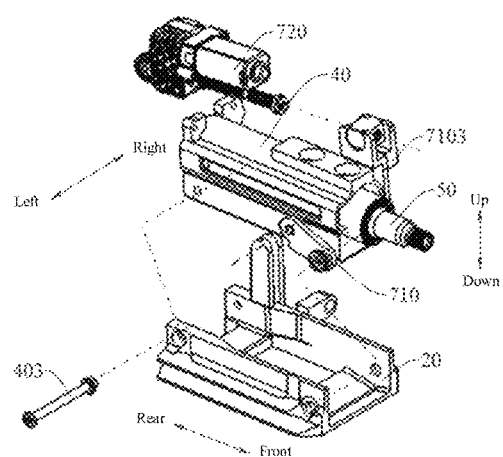
FIG. 8 is a fourth exploded partial view of a structure of a steering column according to an embodiment of the present disclosure.

In an exemplary embodiment of the present disclosure, as illustrated in FIG. 7 and FIG. 8, the lower column assembly 40 has a pivot shaft 403 disposed at the movable base 20. The pivot shaft 403 may be the bolt, which can not only provide connection between the lower column assembly 40 and the movable base 20, but also realize rotation of the lower column assembly 40. In this way, a quantity of components can be reduced and a cost can be lowered.

In some embodiments, as illustrated in FIG. 4 and FIG. 7, the lower column assembly 40 has a second guide groove 402 extending in the first direction. The angle adjustment mechanism 70 includes: a swing base 710 having a first pivot 7101 disposed at the movable base 20, a second pivot 7102 slidably disposed in the second guide groove 402, and a swing arm 7103; and a drive member 720 disposed at the movable base 20. The drive member 720 is connected to the swing arm 7103 and configured to drive the swing arm 7103 to move in the first direction. The drive member 720 drives the swing arm 7103 to enable the swing base 710 to rotate relative to the movable base 20 by the first pivot 7101, and slide and rotate relative to the second guide groove 402 by the second pivot 7102, which can allow the lower column assembly 40 to rotate and realize the angle adjustment.

In some embodiments, the first pivot 7101 and the second pivot 7102 may be the bolts, which can provide connection and act as the pivot shaft, saving parts.

In some embodiments, the drive member 720 is a third lead screw motor assembly. The third lead screw motor assembly is provided with a third lead screw nut (not illustrated) at a lead screw of the third lead screw motor assembly. The third lead screw nut is connected to the swing arm 7103. A structure of the third lead screw motor assembly is relatively simple and convenient to control. The third lead screw motor assembly can drive the third lead screw nut to realize the linear movement, driving the swing arm 7103 to move.

In other examples, the drive member 720 may be any one of the linear movement module, the cylinder, and the electric push rod, or may be another mechanism capable of realizing the linear movement, and thus details thereof will be omitted here.

In some embodiments, as illustrated in FIG. 7, the swing arm 7103 has a mounting groove 7103*a*. The third lead screw nut is disposed in the mounting groove 7103*a*. The mounting groove 7103*a* facilitates detachable mounting of the third lead screw nut, which is beneficial to replacement and maintenance.

In some embodiments, as illustrated in FIG. 1, the angle adjustment mechanism 70 and the second drive mechanism 60 are disposed at two sides of the lower column assembly 40 in an axial direction of the lower column assembly 40. The first drive mechanism 30 is disposed at a side of the angle adjustment mechanism 70 away from the lower column assembly 40. For example, the angle adjustment mechanism 70 and the first drive mechanism 30 are disposed at a right side of the lower column assembly 40 (as illustrated in FIG. 1). The second drive mechanism 60 is disposed at a left side of the lower column assembly 40 (as illustrated in FIG. 1). In this way, the steering column 100 has a compact structural layout and a small volume, which can save a space in the vehicle.

In some embodiments, as illustrated in FIG. 6, the fixation base 10 has a recess 101 on a surface of the fixation base 10. The recess 101 passes through the fixation base 10 in the first direction. For example, the recess 101 passes through a front end and a rear end of the fixation base 10. The recess 101 can provide a mounting space to accommodate a part of the movable base 20, which can reduce an overall height of the steering column 100, saving space. The recess 101 has slide grooves 102 at two sides of the recess 101 in the first direction. The movable base 20 is disposed in the recess 101. The movable base 20 is provided with ridges 201 at two sides of the movable base 20 in the first direction. The ridges 201 are disposed in the slide grooves 102. The slide groove 102 and the ridges 201 can provide guidance for the movable base 20 to improve movement stability of the movable base 20 on the fixation base 10.

In some embodiments, as illustrated in FIG. 6, the slide groove 102 is configured as a V-shaped groove, and the ridge 201 is configured as a V-shaped protrusion, which is convenient to mount and provides better guidance. Of course, the slide groove 102 and the ridge 201 may also have other shapes, such as rectangular shapes, circular shapes, or the like.

A specific embodiment of the steering column 100 according to the present disclosure is described below with reference to the accompanying drawings.

As illustrated in FIG. 1 to FIG. 8, the steering column 100 includes the fixation base 10, the movable base 20, the first drive mechanism 30, the lower column assembly 40, the upper column assembly 50, the second drive mechanism 60, and the angle adjustment mechanism 70.

The fixation base 10 has a recess 101 on the surface of the fixation base 10. The recess 101 passes through the fixation base 10 in the first direction. The recess 101 has slide grooves 102 at two sides of the recess 101 in the first direction. The movable base 20 is disposed in the recess 101. The movable base 20 is provided with ridges 201 at two sides of the movable base 20 in the first direction, the ridges 201 is disposed in the slide grooves 102 to enable the movable base 20 to move in the first direction. The slide groove 102 is configured as the V-shaped groove. The ridge 201 is configured as the V-shaped protrusion.

The first drive mechanism 30 is disposed at the fixation base 10 and connected to the movable base 20. The first drive mechanism 30 is configured to drive the movable base 20 to move relative to the fixation base 10.

The lower column assembly 40 has the pivot shaft 403 disposed at the movable base 20. In addition, the pivot shaft 403 is the bolt. The lower column assembly 40 has the axial direction same as the first direction. The lower column assembly 40 has the chamber in the interior of the lower column assembly 40. The upper column assembly 50 is nested in the chamber and can move in the first direction.

The second drive mechanism 60 is disposed at the lower column assembly 40 and connected to the upper column assembly 50. The second drive mechanism 60 is configured to drive the upper column assembly 50 to move relative to the lower column assembly 40.

The lower column assembly 40 has the first guide groove 401 extending in the first direction and in communication with the chamber. The second drive mechanism 60 includes the connector 610 movable in the first direction and slidably disposed in the first guide groove 401. The connector 60 is connected to the upper column assembly 50 by passing through the first guide groove 401. The second drive mechanism 60 further includes the second lead screw motor assembly 620 disposed at the movable base 20. The second lead screw motor assembly 620 is provided with the second lead screw nut at the lead screw of the second lead screw motor assembly 620. The second lead screw nut is connected to the connector 610.

The first drive mechanism 30 includes the first lead screw motor assembly. The first lead screw motor assembly is provided with the first lead screw nut 301 at the lead screw of the first lead screw motor assembly. The first lead screw nut 301 is connected to the movable base 20.

The angle adjustment mechanism 70 is disposed at the movable base 20. The angle adjustment mechanism 70 is connected to the lower column assembly 40 to enable the lower column assembly 40 to swing in the first direction.

The lower column assembly 40 has the second guide groove 402 extending in the first direction. The angle adjustment mechanism 70 includes: the swing base 710 having the first pivot 7101 disposed at the movable base 20, the second pivot 7102 slidably disposed in the second guide groove 402, and the swing arm 7103; and the drive member 720 disposed at the movable base 20. The drive member 720 is connected to the swing arm 7103 and configured to drive the swing arm 7103 to move in the first direction. The first pivot 7101 and the second pivot 7102 are bolts. The drive member 720 is the third lead screw motor assembly. The third lead screw motor assembly is provided with the third lead screw nut at the lead screw of the third lead screw motor assembly. The third lead screw nut is connected to the swing arm 7103.

The angle adjustment mechanism 70 and the second drive mechanism 60 are disposed at two sides of the lower column assembly 40 in the axial direction of the lower column assembly 40. The first drive mechanism 30 is disposed at the side of the angle adjustment mechanism 70 away from the lower column assembly 40.

The vehicle according to the embodiments of the present disclosure includes the steering column 100 described above.

With the vehicle according to the embodiments of the present disclosure, in the case where the overall space is limited and the overall length of the column remains unchanged, the steering column 100 can achieve a long stroke axial adjustment of the column, and saves the safety space between the column and the front wall, solving problems of existing large structural dimensions and limited space layout of the vehicle. Further, a steering wheel can be fully retracted into an IP trim to provide more space for the driver, and the driver is protected in the event of the vehicle collision, thereby improving safety performance.

Other components and operations of the steering column 100 according to the embodiments of the present disclosure are known to those skilled in the art, and thus details thereof will be omitted here.

In the description of the present disclosure, the description with reference to the terms "some embodiments," "in other embodiments," "further," or "some examples," etc., means that specific features, structures, materials, or characteristics described in conjunction with the embodiment(s) or example(s) are included in at least one embodiment or example of the present disclosure. The appearances of the above phrases in various places throughout this specification are not necessarily referring to the same embodiment or example. Further, the particular features, structures, materials, or characteristics may be combined in any suitable manner in one or more embodiments or examples.

Although embodiments of the present disclosure have been illustrated and described, it is conceivable for those skilled in the art that various changes, modifications, replacements, and variations can be made to these embodiments without departing from the principles and spirit of the present disclosure. The scope of the present disclosure shall be defined by the claims as appended and their equivalents.

What is claimed is:

1. A steering column, comprising:
   a fixation base;
   a movable base movably disposed at the fixation base in a first direction;
   a first drive mechanism disposed at the fixation base and connected to the movable base, the first drive mechanism being configured to drive the movable base to move relative to the fixation base;
   a lower column assembly disposed at the movable base, the lower column assembly having an axial direction same as the first direction;
   an upper column assembly movably disposed at the lower column assembly in the first direction; and
   a second drive mechanism disposed at the lower column assembly and connected to the upper column assembly, the second drive mechanism being configured to drive the upper column assembly to move relative to the lower column assembly.

2. The steering column according to claim 1, wherein:
   the lower column assembly has a chamber in an interior of the lower column assembly, the upper column assembly being nested in the chamber;
   the lower column assembly has a first guide groove extending in the first direction and in communication with the chamber; and
   the second drive mechanism comprises a connector movable in the first direction and slidably disposed in the first guide groove, the connector being connected to the upper column assembly by passing through the first guide groove.

3. The steering column according to claim 2, wherein the second drive mechanism further comprises a second lead screw motor assembly disposed at the movable base, the second lead screw motor assembly being provided with a second lead screw nut at a lead screw of the second lead screw motor assembly, and the second lead screw nut being connected to the connector.

4. The steering column according to claim 1, wherein the first drive mechanism comprises a first lead screw motor assembly, the first lead screw motor assembly being provided with a first lead screw nut at a lead screw of the first lead screw motor assembly, and the first lead screw nut being connected to the movable base.

5. The steering column according to claim 1, wherein:
   the lower column assembly is pivotably disposed at the movable base; and
   the steering column further comprises an angle adjustment mechanism disposed at the movable base, the angle adjustment mechanism being connected to the lower column assembly to enable the lower column assembly to swing in the first direction.

6. The steering column according to claim 5, wherein:
   the lower column assembly has a second guide groove extending in the first direction; and
   the angle adjustment mechanism comprises:
     a swing base having a first pivot disposed at the movable base, a second pivot slidably disposed in the second guide groove, and a swing arm; and
     a drive member disposed at the movable base, the drive member being connected to the swing arm and configured to drive the swing arm to move in the first direction.

7. The steering column according to claim 6, wherein the drive member is a third lead screw motor assembly, the third lead screw motor assembly being provided with a third lead screw nut at a lead screw of the third lead screw motor assembly, and the third lead screw nut being connected to the swing arm.

8. The steering column according to claim 5, wherein:
   the angle adjustment mechanism and the second drive mechanism are disposed at two sides of the lower column assembly in the axial direction of the lower column assembly; and
   the first drive mechanism is disposed at a side of the angle adjustment mechanism away from the lower column assembly.

9. The steering column according to claim 1, wherein:
   the fixation base has a recess on a surface of the fixation base, the recess extending through the fixation base in the first direction, the recess having slide grooves at two sides of the recess in the first direction, and the movable base being disposed in the recess; and
   the movable base is provided with ridges at two sides of the movable base in the first direction, the ridges being disposed in the slide grooves.

10. A vehicle, comprising a steering column, the steering column comprising:
    a fixation base;
    a movable base movably disposed at the fixation base in a first direction;
    a first drive mechanism disposed at the fixation base and connected to the movable base, the first drive mechanism being configured to drive the movable base to move relative to the fixation base;
    a lower column assembly disposed at the movable base, the lower column assembly having an axial direction same as the first direction;
    an upper column assembly movably disposed at the lower column assembly in the first direction; and
    a second drive mechanism disposed at the lower column assembly and connected to the upper column assembly, the second drive mechanism being configured to drive the upper column assembly to move relative to the lower column assembly.

11. The vehicle according to claim 10, wherein:
    the lower column assembly has a chamber in an interior of the lower column assembly, the upper column assembly being nested in the chamber;

the lower column assembly has a first guide groove extending in the first direction and in communication with the chamber; and the second drive mechanism comprises a connector movable in the first direction and slidably disposed in the first guide groove, the connector being connected to the upper column assembly by passing through the first guide groove.

12. The vehicle according to claim 11, wherein the second drive mechanism further comprises a second lead screw motor assembly disposed at the movable base, the second lead screw motor assembly being provided with a second lead screw nut at a lead screw of the second lead screw motor assembly, and the second lead screw nut being connected to the connector.

13. The vehicle according to claim 10, wherein the first drive mechanism comprises a first lead screw motor assembly, the first lead screw motor assembly being provided with a first lead screw nut at a lead screw of the first lead screw motor assembly, and the first lead screw nut being connected to the movable base.

14. The vehicle according to claim 10, wherein:
the lower column assembly is pivotably disposed at the movable base; and
the steering column further comprises an angle adjustment mechanism disposed at the movable base, the angle adjustment mechanism being connected to the lower column assembly to enable the lower column assembly to swing in the first direction.

15. The vehicle according to claim 14, wherein:
the lower column assembly has a second guide groove extending in the first direction; and
the angle adjustment mechanism comprises:
a swing base having a first pivot disposed at the movable base, a second pivot slidably disposed in the second guide groove, and a swing arm; and
a drive member disposed at the movable base, the drive member being connected to the swing arm and configured to drive the swing arm to move in the first direction.

16. The vehicle according to claim 15, wherein the drive member is a third lead screw motor assembly, the third lead screw motor assembly being provided with a third lead screw nut at a lead screw of the third lead screw motor assembly, and the third lead screw nut being connected to the swing arm.

17. The vehicle according to claim 14, wherein:
the angle adjustment mechanism and the second drive mechanism are disposed at two sides of the lower column assembly in the axial direction of the lower column assembly; and
the first drive mechanism is disposed at a side of the angle adjustment mechanism away from the lower column assembly.

18. The vehicle according to claim 10, wherein:
the fixation base has a recess on a surface of the fixation base, the recess extending through the fixation base in the first direction, the recess having slide grooves at two sides of the recess in the first direction, and the movable base being disposed in the recess; and
the movable base is provided with ridges at two sides of the movable base in the first direction, the ridges being disposed in the slide grooves.

* * * * *